United States Patent

Hamada

[11] Patent Number: 6,097,304
[45] Date of Patent: Aug. 1, 2000

[54] MESSAGE PROCESSING METHOD AND APPARATUS THEREFOR

[75] Inventor: Hiroshi Hamada, Kawasaki, Japan

[73] Assignee: Canon Kabushiki Kaisha, Tokyo, Japan

[21] Appl. No.: 07/895,467

[22] Filed: Jun. 8, 1992

Related U.S. Application Data

[63] Continuation of application No. 07/627,918, Dec. 17, 1990, abandoned, which is a continuation of application No. 07/245,268, Sep. 16, 1988, abandoned.

[30] Foreign Application Priority Data

Sep. 21, 1987 [JP] Japan .................................. 62-234958

[51] Int. Cl.$^7$ .................................................. G05B 23/02
[52] U.S. Cl. ............................... 340/825.06; 340/825.2; 358/402
[58] Field of Search ....................... 371/32; 340/825.06, 340/825.14, 825.2, 825.21, 309.15; 179/17.5; 379/69, 100, 95, 96, 98; 358/84, 402

[56] References Cited

U.S. PATENT DOCUMENTS

| | | | |
|---|---|---|---|
| 4,086,443 | 4/1978 | Gorham et al. | 379/100 |
| 4,406,925 | 9/1983 | Jordan et al. | 379/69 X |
| 4,447,872 | 5/1984 | Nothaft | 340/825.26 X |
| 4,506,111 | 3/1985 | Takenouchi et al. | 379/96 X |
| 4,646,160 | 2/1987 | Iizuka et al. | 379/100 X |

FOREIGN PATENT DOCUMENTS

| | | |
|---|---|---|
| 58-196754 | 11/1983 | Japan . |
| 63-90935 | 4/1988 | Japan . |
| 63-90936 | 4/1988 | Japan . |
| 63-90937 | 4/1988 | Japan . |
| 63-90938 | 4/1988 | Japan . |
| 63-90939 | 4/1988 | Japan . |
| 63-90940 | 4/1988 | Japan . |
| 63-90941 | 4/1988 | Japan . |

*Primary Examiner*—Kent Chang
*Attorney, Agent, or Firm*—Fitzpatrick, Cella, Harper & Scinto

[57] ABSTRACT

Provided are a message processing method and apparatus for allowing information to be transmitted by time designation without the influence of a time differential between the locations of sending and receiving parties. A preferred embodiment is such that when a transmission cannot be made at a designated time, the sending party is so notified. Another preferred embodiment is such that when transmission time is set in the form of standard time, information is transmitted at the set standard time.

23 Claims, 5 Drawing Sheets

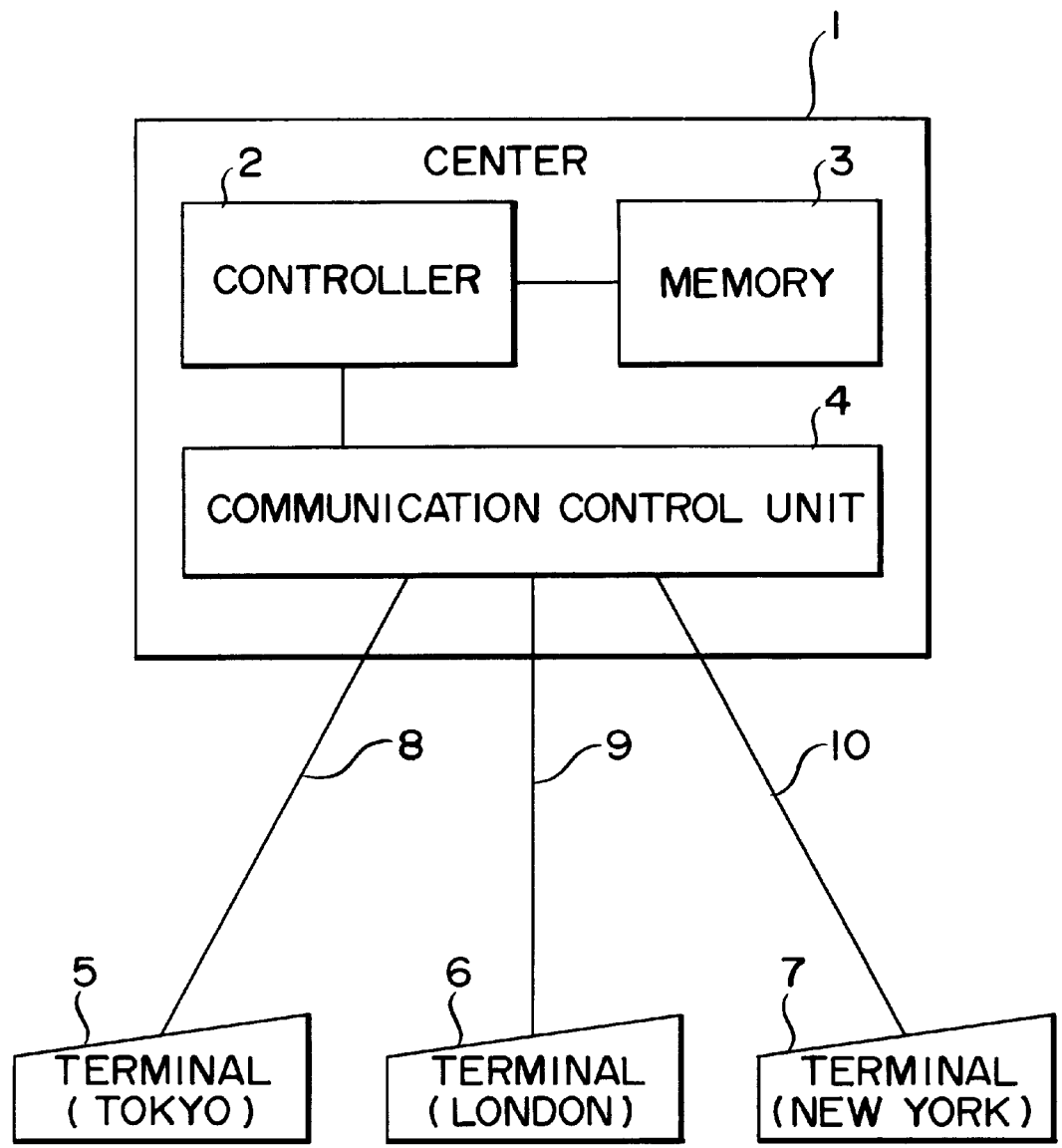
F I G. 1

```
3.1 : SEND :
  62 : QUANTITY OF DOCS : 2
  13 : PRIORITY : 3
  14 : ORIGINATOR :
  [NAME OF SENDING PARTY]

15 : RECIPIENTS :
  [NAMES OF RECEIVING PARTIES]
         :
```

```
3.1 : SEND
  62 : QUANTITY OF DOCS : 2
  13 : PRIORITY : 3
  14 : ORIGINATOR :
  [NAME OF SENDING PARTY]
  = 8612260800D

15 : RECIPIENTS :
  [NAMES OF RECEIVING PARTIES]
```

F I G. 4

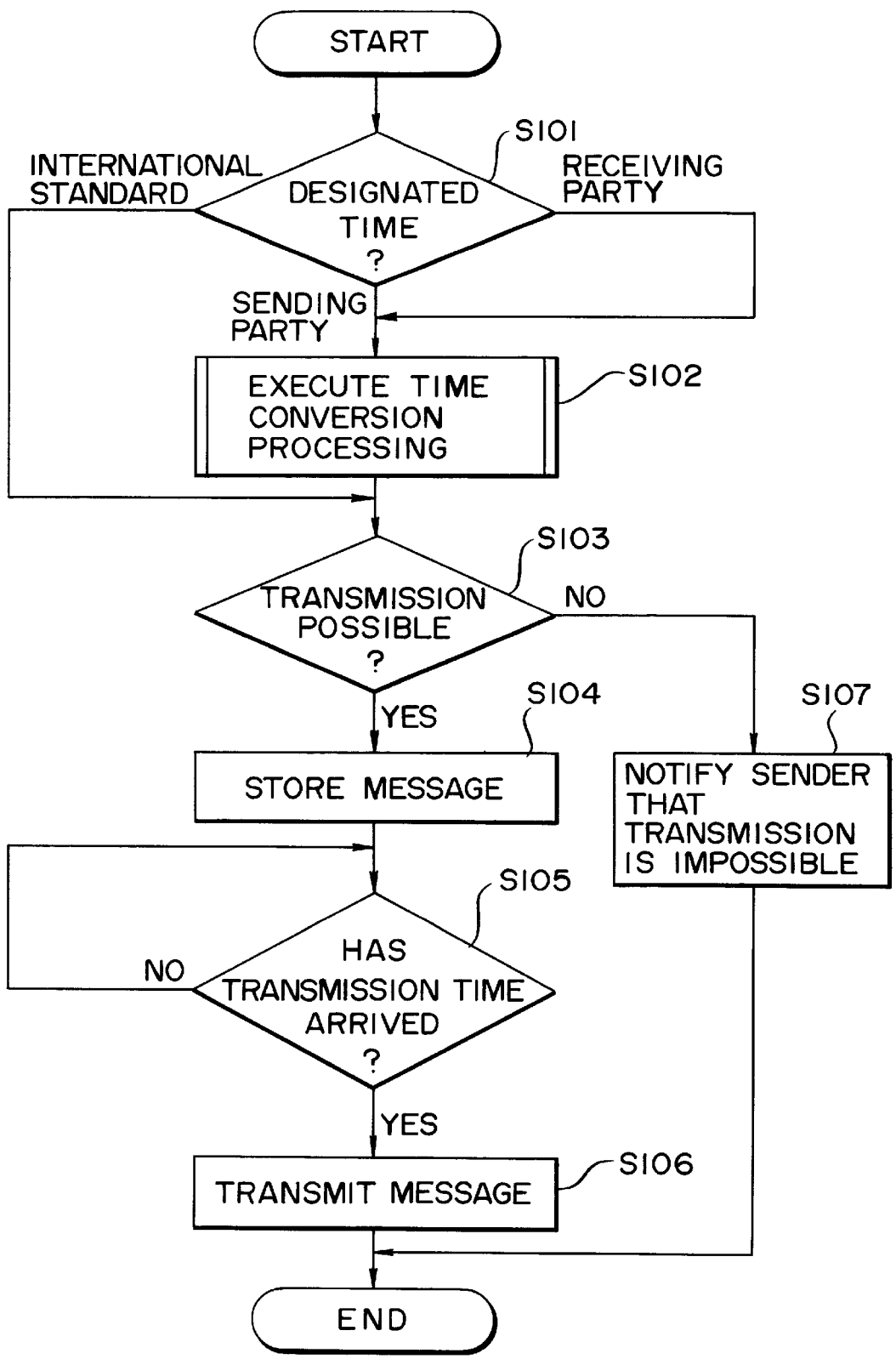
F I G. 6

MESSAGE PROCESSING METHOD AND APPARATUS THEREFOR

This application is a continuation of application Ser. No. 07/627,918 filed Dec. 17, 1990, now abandoned, which is a continuation of application Ser. No. 07/245,268 filed Sep. 16, 1988, now abandoned.

BACKGROUND OF THE INVENTION

This invention relates to a message processing method and apparatus which uses a telematique terminal such as a facsimile or teletex.

A message communication system is known as a communication system which uses telematique terminals. This message communication system is one in which a plurality of telematique terminals are connected via a communications network to a host computer having a store-and-forward exchange function. This system is used for communicating messages among the terminals via the host computer. A service now available for transmitting messages includes the allotted transmission of messages in accordance with a specific date and time designated by the sender. In such allotted transmission, the dates and times at which messages are to be transmitted to various destinations are specified by the sender. The actual transmission of the messages takes place when the specified date and time arrive.

As mentioned above, the construction of a message communication system is such that a plurality of telematique terminals such a facsimile or teletex are connected to a host computer via a communications network. This communications network has come into wide use internationally, and the message communication system is utilized especially as means for communicating messages between countries.

The applicant has filed a number of applications for message communication systems belonging to the same technical field as that of the present invention. For example, see Japanese Patent Application Laid-Open (KOKAI) No. 63-90935 (application filed on Oct. 6, 1986), Japanese Patent Application Laid-Open (KOKAI) No. 63-90936 (application filed on Oct. 6, 1986), Japanese Patent Application Laid-Open (KOKAI) No. 63-90937 (application filed on Oct. 6, 1986), Japanese Patent Application Laid-Open (KOKAI) No. 63-90938 (application filed on Oct. 6, 1986), Japanese Patent Application Laid-Open (KOKAI) No. 63-90939 (application filed on Oct. 6, 1986), Japanese Patent Application Laid-Open (KOKAI) No. 63-90940 (application filed on Oct. 6, 1986), and Japanese Patent Application Laid-Open (KOKAI) No. 63-90941 (application filed on Oct. 6, 1986). The first two of these seven applications were filed in the U.S.A. in combined form as U.S. Ser. No. 102,623, and the latter five were filed in the U.S.A. in combined form as U.S. Ser. No. 481,691.

When messages are transmitted by time designation in a prior-art message communication systems, the time designated is set based on the time prevailing at the location where the sending party's terminal is installed. Accordingly, when a transmission is made by time designation to a receiving party located in a different time zone, it is required that the sender designate a local time suited to the convenience of the receiving party, e.g., a time, such as 8:00 AM, that avoids the midnight hours. This means that before a transmission time can be designated, the sender must calculate the time differential between his location and the local time at the receiving party's location and then, based on the time differential, perform a time conversion to determine at what time the transmission should be made. This is a very troublesome task.

SUMMARY OF THE INVENTION

A first object of the present invention is to provide a message processing method that allows information to be transmitted by time designation without being influenced by a time differential between the locations of the sending and receiving parties.

According to the present invention, the aforementioned first object is obtained by providing a message processing method for performing an exchange of information between locations having a time differential, the method comprising the steps of designating an information transmission time based on local time at a receiving party's location, setting a transmission starting time upon calculating a time differential between a certain time at a sending party's location and the local time at the receiving party's location, and transmitting the information to the receiving party when the transmission starting time that has been set arrives.

Thus, this eliminates the need for the sending party to perform a troublesome time differential calculation and makes it possible for the sending party to easily specify a transmission time for a transmission at the receiving party's local time.

A second object of the present invention is to provide a message processing method in which, when a transmission cannot be made at a designated time, the sending party is so notified.

According to the present invention, the aforementioned second object is obtained by providing a message processing method for performing an exchange of information between locations having a time differential, the method comprising the steps of designating an information transmission time based on local time at a receiving party's location, calculating a time differential between a certain time and the local time at the receiving party's location, determining whether transmission is possible or impossible based on a time differential between a sending party and the receiving party, and informing the sending party that transmission is impossible when transmission is found to be impossible in the determining step.

Thus, the sending party is promptly informed of whether information can be transmitted at a desired time.

A third object of the present invention is to provide a message processing method in which, when transmission time is set in the form of standard time information is transmitted at the set standard time.

According to the present invention, the aforementioned third object is obtained by providing a message processing method for performing an exchange of information between locations having a time differential, the method comprising the steps of designating an information transmission time based on local time at a receiving party's location, setting a transmission starting time upon calculating a time differential between a certain time and the local time at the receiving party's location, and transmitting the information to the receiving party when the transmission starting time arrives, wherein when a designation in accordance with standard time common to various locations is included in the designation of transmission time and transmission time is designated, in the form of the standard time, the standard time is set as the transmission starting time.

Thus, a transmission based on standard time is possible between users.

A fourth object of the present invention is to provide a message processing apparatus that allows information to be transmitted by time designation without being influenced by a time differential between the locations of the sending and receiving parties.

According to the present invention, the aforementioned fourth object is obtained by providing a message processing apparatus for performing an exchange of information between locations having a time differential, the apparatus comprising input means for inputting an information transmission time from a sending party based on local time at a receiving party's location, setting means for setting a transmission starting time upon calculating a time differential between a certain time and the local time at the receiving party's location, storing means for storing the information from the sending party, and transmitting means for transmitting the information stored in the storing means to the receiving party when the transmission starting time arrives.

Thus, this eliminates the need for the sending party to perform a troublesome time differential calculation and makes it possible for the sending party to easily specify a transmission time for a transmission at the receiving party's local time.

A fifth object of the present invention is to provide a message processing apparatus in which, when a transmission cannot be made at a designated time, the sending party is so notified.

According to the present invention, the aforementioned fifth object is obtained by providing a message processing apparatus for performing an exchange of information between locations having a time differential, the apparatus comprising input means for inputting an information transmission time from a sending party based on local time at a receiving party's location, setting means for setting a transmission starting time upon calculating a time differential between a certain time and the local time at the receiving party's location, storing means for storing the information from the sending party, and transmitting means for transmitting the information stored in the storing means to the receiving party when the transmission starting time arrives, the setting means having decision means for determining whether transmission is possible or impossible based on the calculated time differential, and alarm means for informing the sending party that transmission is impossible when transmission is determined to be impossible by the decision means.

Thus, the sending party is promptly informed of whether information can be transmitted at a desired time.

A sixth object of the present invention is to provide a message processing apparatus in which, when transmission time is set in the form of standard time, information is transmitted at the set standard time.

According to the present invention, the aforementioned sixth object is obtained by providing a message processing apparatus for performing an exchange of information between locations having a time differential, the apparatus comprising input means for inputting an information transmission time from a sending party based on local time at a receiving party's location, setting means for setting a transmission starting time upon calculating a time differential between a certain time and the local time at the receiving party's location, storing means for storing the information from the sending party, and transmitting means for transmitting the information stored in the storing means to the receiving party when the transmission starting time arrives, the designating means including standard time designating means for designating transmission time in accordance with standard time common to various locations, the setting means including standard time setting means for setting the standard time as transmission starting time when a transmission time is designated by the standard time designating means.

Thus, a transmission based on standard time is possible between users.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram useful in describing an embodiment of a message communications system according to the present invention;

FIG. 2 is a view illustrating the constitution of a message;

FIGS. 3 and 4 are views for describing an example of the contents of a control document;

FIG. 6 is a flowchart for describing the processing associated with a time-designated transmission in accordance with the present embodiment.

DESCRIPTION OF THE PREFERRED EMBODIMENT

Figures 2, 3:
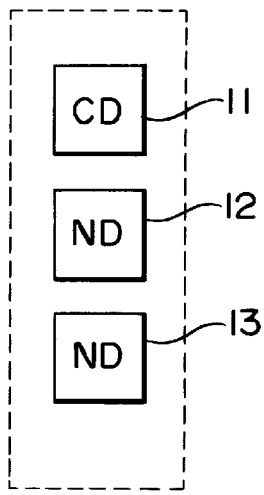

An embodiment of a message communication system according to the present invention will now be described in detail with reference to the accompanying drawings.

FIG. 1 illustrates the construction of a message communication system embodying the invention. The system includes a center 1 a host computer for executing communication processing in the message communication system. The center 1 has a controller for overall control of the meassage communication system, a memory 3 for storing information (hereinafter referred to as a "message") when an information exchange is carried out, and a communication control unit 4 for controlling data communication between the center 1 and each of a number of communication terminals. The system further includes telematique terminals 5, 6 and 7 such as facsimile and telex machines each of which has a data communication function for communication with other terminals at other locations. The terminals 5, 6 and 7 are connected to the center 1 by communication lines 8, 9 and 10, respectively. The terminals 5, 6 and 7 can be used for data communication among a number of countries. In the illustrated example, the location at which terminal 5 is installed is Tokyo, terminal 6 is located in London, and terminal 7 is located in New York. As for the location of the center 1, this would be in the vicinity of the sending party, i.e., near Tokyo if the sending party is located in Tokyo. A center capable of performing a store and forward exchange is utilized. Though only three examples of terminal locations are mentioned in the present embodiment, the invention is not limited to his number.

The message communication system is constructed as set forth above. The method through which a message is transmitted will now be described in detail with reference to FIGS. 2 and 3.

FIG. 2 illustrates the constitution of a message according to the present embodiment. The message is composed of a control document (control message), CD comprising a control element, and normal documents ND each comprising image data or character code data (e.g. a message statement). FIG. 3 is a view clarifying, in hypothetical terms, the contents of the control document shown in FIG. 2.

In FIGS. 2 and 3, numeral 11 denotes the CD and numerals 12, 13 denotes the ND's.

An example will be described for a case where a message is transmitted by time designation from the terminal 5 in Tokyo to the terminal 7 in New York. First, if a message is to be transmitted at a local time (New York time) of 8:00 AM on December 26, the sending party is capable of designating a transmission time which specifies the local time of 8:00 AM, December 26. In order to achieve this, the user stores an element, namely a parameter, which indicates that the time designated for the transmission is the local time in New York, in the CD 11 employed in the message communication system. Naturally, if the transmission whose time is designated is to be made from Tokyo to London, a parameter peculiar to London would be stored in the CD 11 just as set forth above. It should be noted that the CD refers to a message formed from control information indicative of a transmitted message sent from the sending party to the center before the transmitted message.

The aforementioned CD 11 will now be described with reference to FIG. 3. "SEND" indicates the item to be transmitted, in which "QUANTITY OF DOCUMENTS: 2" indicates that the number of documents to be transmitted is two, and "PRIORITY: 3" indicates the priority designation, namely that the order of priority is "3", the highest among a range of priorities of 0 to 3, by way of example. Further, "ORIGINATOR" indicates the name of the sending party, and "RECIPIENTS" indicates the names of the receiving parties. Some of these items relating to transmission are stored in the CD 11 as a plurality of elements.

Reference will now be had to FIG. 4 to describe an example in which the aforementioned parameter indicating local time is also stored in the CD 11.

In FIG. 4, numeral 14 denotes a section in which the name of the sending party appears. The time for transmission designated by the sending party is inputted in section 14. In accordance with the example shown in FIG. 4, a character string 15 is inputted in section 14 in the form of data "8612260800D". The item of data "D" at the end of this character string represents a parameter indicating that the time designated for transmission is the local time at the location of the receiving party. With regard to the contents of the character string 15, "86" at the beginning of the string represents the year 1986, "1226" represents the date December 26, and "0800" represents the local time of 8:00 AM. Thus, the documents will be transmitted to the receiving party at 8:00 AM on Dec. 26, 1986, local time. If the item of data "D" for deciding the reference time is replaced by an item of data "Z", this will indicate that the transmission time is international standard time.

The center 1 shown in FIG. 1 will now be described in detail with reference to FIG. 5.

Figure 5:
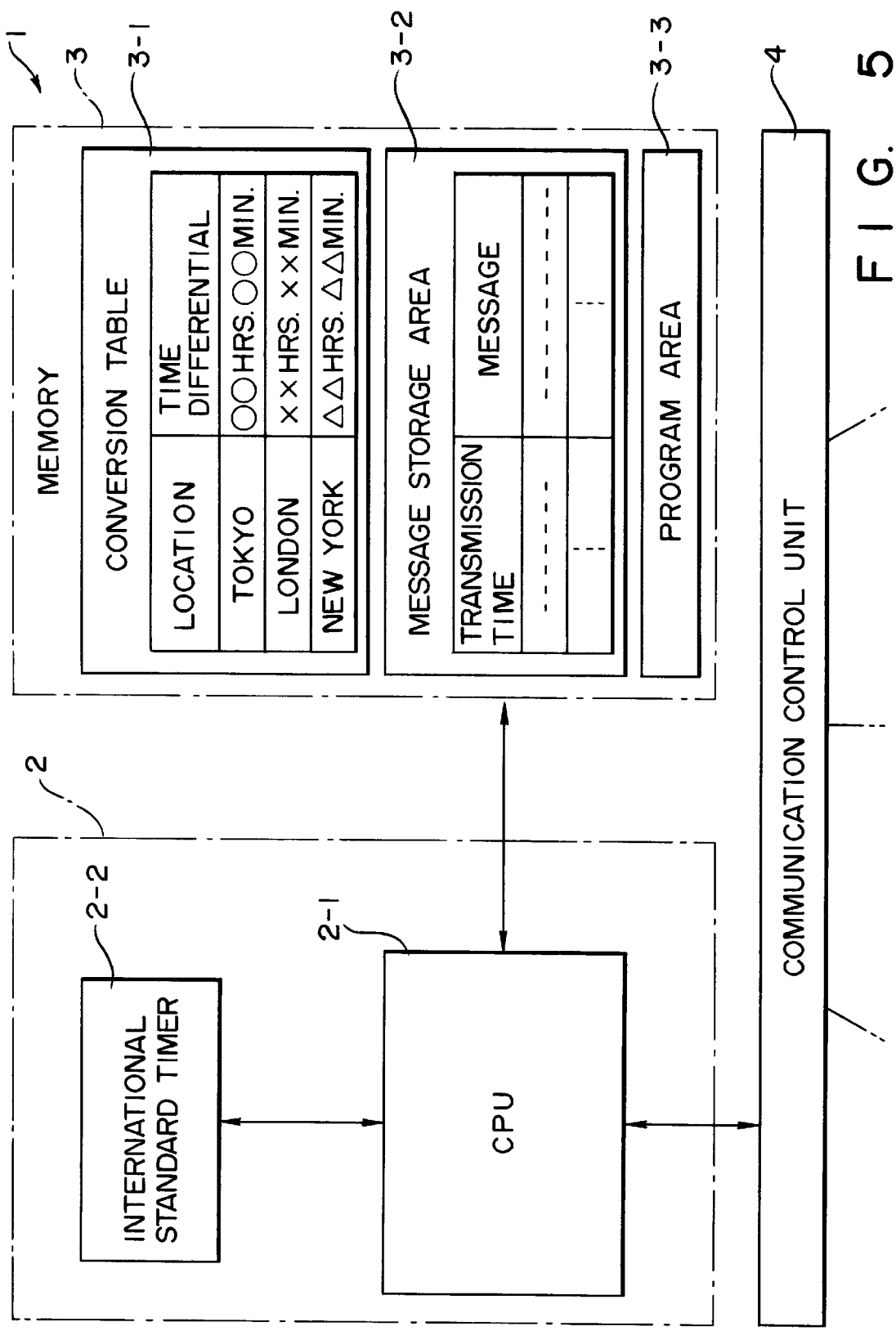
FIG. 5 is a block diagram useful in describing the arrangement of a center in the present embodiment.

FIG. 5 is a block diagram useful in describing the construction of the center 1 of the present embodiment. In FIG. 5, the controller 2 includes a central processing unit (hereinafter referred to as a "CPU") 2-1 for controlling the overall operation of the center 1, and an international standard timer 2-2 for keeping track of the aforementioned international standard time. The memory 3 includes a time differential conversion table 3-1 storing, in table form, time differentials between international standard time and local time at each of the locations of the terminals connected to the center 1, with the international standard time kept by the international standard timer 2-2 serving as a reference. The memory 3 further includes a message storage area 3-2 for storing, in pairs, information including transmittable messages and the message receiving parties, and message transmission time. Also provided in the memory 3 is a program area 3-3 for storing a control program, an error processing program and a program for performing processing in accordance with a flowchart shown in FIG. 6, described below.

The controller 2 in the center 1 of the message communication system described above operates in accordance with the flowchart of FIG. 6 after it receives the CD 11. In the present embodiment, international standard time is the transmission time reference used in the controller 2. It should be noted that the present invention is not one in which the reference for transmission time is limited to international standard time. For example, any standard time agreed upon between users exchanging messages can be used as a reference, and in this respect various modifications are possible without departing from the gist of the invention.

When a message the transmission time whereof has been designated is received during operation of the message communication system, the controller 2 checks the character string 15, which indicates the time (date and time) designated for the transmission, among the parameters in the CD 11 (step S101 in the flowchart of FIG. 6). If the item of data "Z" is at the end of the character string 15, this means that the designated transmission time indicated by character string 15 represents international standard time. Accordingly, the program proceeds directly to a step S103 (described below) to execute processing for determining whether a transmission at the international standard time is possible.

If the item of data "D" is at the end of the character string 15, as in the control document 11 illustrated in FIG. 4, the controller 2 executes time conversion processing (step S102) when it recognizes that the designated transmission time indicated by the character string 15 is the local time at the location of the receiving party. In the time conversion processing of step S102, the time at which the transmission is to be made to the inputted receiving party is converted into international standard time by using the conversion table 3-1. If neither "D" nor "Z" is attached to the end of the character string 15, the controller 2 converts the transmission time, which is expressed in the form of the time at the location of the sending party, into international standard time by using the conversion table 3-1. A suitable method of executing the above-mentioned time conversion processing is for the controller 2 to memorize a conversion table or the like in which are stored the time differentials between international standard time and the times at the locations where the terminals are installed, read the table when necessary and effect a conversion into international standard time, thereby performing the time conversion.

Next, at the step S103, the controller determines whether transmission of a message is possible by comparing (a) the time obtained by converting a designated transmission time, which is designated in the form of the receiving party's local time or the time at the location of the sending party, into international standard time, or (b) the time designated in the form of international standard time, with (c) the presently prevailing international standard time. By thus determining whether transmission is possible, one can verify whether there is an error in the designation of the time for transmission to a receiving party for which there is a time differential with respect to the sending party, namely an error in which the sender has mistakenly designated a time for message transmission that has already passed. When it is confirmed at the step S103 that the transmission time has been designated correctly, the controller 2 temporarily stores the message in the message storage area 3-2 of the memory 3 (step S104) in order to perform the transmission of the message. At step S104, the transmission time converted into international standard time is stored at the same time as the message. Thereafter, the controller 2 senses whether the transmission time has arrived (step S105) by comparing the transmission time for the message stored in the message storage area 3-2 with the international standard timer 2-2. When the transmission time arrives (YES at step S105), processing for transmission of the message to the terminal of the receiving party begins (step S106).

When an error is sensed in the designated time at the step S103, the controller 2 responds by informing the sending party of the fact that transmission is impossible (step S107). When so notifying the sending party, the controller 2 is also capable of giving advice by notifying the sending party of a range of times within which designation is possible at the presently prevailing time based on the designated date and time (transmission time) or by tacking on a time discrepancy with respect to the presently prevailing time.

Thus, in accordance with the message communication system of the present embodiment, all that need be done to set a transmission time is to provide one reference time, i.e., international standard time, and have the system either calculate the time differentials among the reference times at the locations of all of the terminals interconnected via the center or look up a reference table for a time differential conversion. Accordingly, it is no longer necessary for the sending party to designate a transmission time in the form of the local time at the location of the receiving party, namely to calculate a time differential based on the sending party's time and the receiving party's local time.

As described above, errors in designating the transmission time, which occur in the prior art, are eliminated. Since transmission time can be designated directly in the form of the receiving party's local time without requiring that the sending party calculate the time differential, transmission of a message at the designated time can be performed with ease. In addition, the user is immediately informed of whether or not it is possible to transmit a message at a desired time. Communication between users based on a standard time can also be made possible.

As many apparently widely different embodiments of the present invention can be made without departing from the spirit and scope thereof, it is to be understood that the invention is not limited to the specific embodiments thereof except as defined in the appended claims.

What is claimed is:

1. A message processing method for performing an exchange of information between a sending party's terminal located in one time zone having a respective local time and at least one receiving party's terminal located in a different time zone having a respective local time, the two time zones having a time zone differential therebetween, comprising the steps of:

manually designating at the sending party's terminal a first local transmission starting time in terms of the local time at the receiving party's location;

automatically calculating the time zone differential between the local time at the sending party's location and the local time at the receiving party's location;

automatically converting the first local transmission starting time into a second local transmission starting time in terms of the local time at the sending party's location, based on the calculated time zone differential;

determining if the manually designated first local transmission time already has passed the local time at the receiving party's location; and initiating an alarm and informing the sending party's terminal of a time capable of designation of transmission when it has been determined at said determining step that the first local information transmission starting time manually designated already has passed the local time at the receiving party's location.

2. The method according to claim 1, wherein the exchange of information is performed using telematique terminals.

3. The method according to claim 1, wherein the time zone differential is calculated using as a reference a standard time common to the locations of all of the terminals.

4. The method according to claim 3, wherein time zone differentials between the standard time and the local times at the locations of all of the terminals are stored in advance in the form of a table.

5. The method according to claim 4, wherein the standard time is international standard time.

6. A message processing method for performing an exchange of information between a sending party's terminal located in one time zone having a respective local time and at least one receiving party's terminal located in a different time zone having a respective local time, the two time zones having a time zone differential therebetween, comprising the steps of:

manually designating at the sending party's terminal a first local transmission starting time in terms of the local time at the receiving party's location;

automatically calculating the time zone differential between the local time at the sending party's location and the local time at the receiving party's location;

automatically converting the first local transmission starting time into a second local transmission starting time at the sending party's location, based on the calculated time zone differential;

automatically determining whether transmission is impossible based on whether the second local information transmission time at the sending party's location is earlier than the local time there at which manual designating occurs taking into account the calculated time zone differential; and informing the sending party's terminal that transmission is impossible when transmission is determined to be impossible in the determining step.

7. The method according to claim 6, wherein the exchange of information is performed using telematique terminals.

8. The method according to claim 6, wherein the time zone differential is calculated using as a reference a standard time common to the locations of all of the terminals.

9. The method according to claim 8, wherein time zone differentials between the standard time and the local times at the locations of all of the terminals are stored in advance in the form of a table.

10. The method according to claim 9, wherein the standard time is international standard time.

11. A message processing apparatus for performing an exchange of information between a sending party's terminal located in one time zone having a respective local time and at least one receiving party's terminal located in a different time zone having a respective local time, the two time zones having a time zone differential therebetween, comprising:

input means at the sending party's terminal for manually inputting a first local transmission starting time in terms of the local time at the receiving party's location and for inputting information to be sent to the receiving party's terminal;

calculating means for automatically calculating the time zone differential between the local time at the sending party's location and the local time at the receiving party's location;

conversion means for automatically converting the first local transmission starting time into a second local transmission starting time in terms of the local time at the sending party's location, based on the calculated time zone differential;

means for determining if the manually inputted first local transmission time already has passed the local time at the receiving party's location;

storing means for storing information to be sent to the receiving party's terminal;

transmitting means for transmitting the information stored in said storing means to the receiving party's terminal at the second local transmission starting time at the sending party's location; and informing means for initiating an alarm and informing said sending party's terminal of a time capable of designation of transmission when it has been determined by said means for determining that the first local information transmission starting time manually inputted by said input means already has passed the local time at the receiving party's location.

12. The apparatus according to claim 11, wherein the information exchange is performed using telematique terminals.

13. The apparatus according to claim 11, wherein said calculating means uses a standard time common to the locations of all of said terminals as a reference.

14. The apparatus according to claim 13, wherein said calculating means includes a time differential calculating table in which time differentials between the standard time and the local times at the locations of all the terminals are stored in advance.

15. The apparatus according to claim 14, wherein said standard time is international standard time.

16. A message processing apparatus for performing an exchange of information between a sending party's terminal located in one time zone having a respective local time and at least one receiving party's terminal located in a different time zone having a respective local time, the two time zones having a time zone differential therebetween, comprising:

input means at the sending party's terminal for manually inputting a first local transmission starting time in terms of the local time at the receiving party's location and for inputting information to be sent to the receiving party's terminal;

calculating means for automatically calculating the time zone differential between the local time at the sending party's location and the local time at the receiving party's location;

conversion means for automatically converting the first local transmission starting time into a second local transmission starting time in terms of the local time at the sending party's location, based on the calculated time zone differential;

decision means for determining whether transmission is impossible based on whether the second local information transmission starting time at the sending party's location is earlier than the local time there at which manual designating occurs taking into account the calculated time zone differential;

alarm means for informing the sending party that transmission is impossible when transmission is determined to be impossible by said decision means;

storing means for storing the information to be sent to the receiving party's terminal; and transmitting means for transmitting the information stored in said storing means to the receiving party's terminal at the second local transmission starting time at the sending party's location.

17. The apparatus according to claim 16, wherein the information exchange is performed using telematique terminals.

18. The apparatus according to claim 16, wherein said calculating means uses a standard time common to the locations of all of said terminals as a reference.

19. The apparatus according to claim 18, wherein said calculating means includes a time differential calculating table in which time differentials between the standard time and the local times at the locations of all the terminals are stored in advance.

20. The apparatus according to claim 19, wherein said standard time is international standard time.

21. The method according to claim 6, wherein said informing step informs the sending party that transmission is impossible and of a transmittable time when transmission of the information is impossible.

22. The apparatus according to claim 16, wherein said alarm means informs the sending party that transmission is impossible and of a transmittable time when transmission of the information is impossible.

23. A message processing method for performing an exchange of information between a sending party's terminal located in one time zone having a respective local time and one or more receiving party's terminals located in one or more different time zones having respective local times and respective time zone differentials therebetween, comprising the steps of:

manually designating at the sending party's terminal an information transmission time representing a first local transmission starting time in terms of the local time at a selected receiving party's location;

storing in a memory the time zone differentials between the local time at the sending party's location and each one of the local times at the receiving party's locations;

automatically calculating the time zone differential between the local time at the sending party's location and the local time at the selected receiving party's location by retrieving the respective time zone differential from the memory;

automatically converting the first local transmission starting time into a second local transmission starting time in terms of the local time at the sending party's location, based on the retrieved time zone differential;

determining if the manually designated first local transmission time already has passed the local time at the receiving party's location; and initiating an alarm and informing said sending party's terminal of a time capable of designation of transmission when it has been determined at said determining step that the first local information transmission starting time manually designated already has passed the local time at the selected receiving party's location.

* * * * *

UNITED STATES PATENT AND TRADEMARK OFFICE
CERTIFICATE OF CORRECTION

PATENT NO.   : 6,097,304
DATED        : August 1, 2000
INVENTOR(S)  : HIROSHI HAMADA It is certified that error appears in the above-identified patent and that said Letters Patent is hereby corrected as shown below:

COLUMN 2:

Line 45, "time information" should read --time, information--; and line 60, "designated," should read --designated--.

COLUMN 4:

Line 63, "message)," should read --message)--.

Signed and Sealed this

Twenty-fourth Day of April, 2001

Attest:

NICHOLAS P. GODICI

*Attesting Officer*      *Acting Director of the United States Patent and Trademark Office*